United States Patent [19]

Johansson

[11] 3,751,586

[45] Aug. 7, 1973

[54] CIRCUIT SYSTEM FOR COMPENSATING THE INFLUENCE OF THE BACK-GROUND RADIATION ON THE PICTURE DISPLAY IN AN INFRA-RED CAMERA

[75] Inventor: Bengt Henri Johansson, Karlskoga, Sweden

[73] Assignee: Aktiebolaget Bofors, Bofors, Sweden

[22] Filed: Oct. 22, 1970

[21] Appl. No.: 82,990

[30] Foreign Application Priority Data

Oct. 29, 1969 Sweden ............................ 14774/69

[52] U.S. Cl....... 178/7.1, 178/DIG. 8, 178/DIG. 26, 250/83.3 HP

[51] Int. Cl..................................... 250 , H04n 5/19

[58] Field of Search................ 178/DIG. 8, DIG. 12, 178/DIG. 25, DIG. 26; 250/83.3 H, 83.3 HP

[56] References Cited

UNITED STATES PATENTS 3,144,554 8/1964 Whitney........................ 250/83.3 H

*Primary Examiner*—Robert L. Griffin

*Assistant Examiner*—Joseph A. Orsino, Jr.

*Attorney*—Hane, Baxley & Spiecens

[57] ABSTRACT

In an infra-red (IR) camera system a scene is line scanned to provide a video signal which includes a picture signal representing the object being monitored and background signal representing the temperature changing background region. Portions of the video signal are controllably sensed during particular times of the line scans to generate a compensating signal which is superimposed on the video signal to minimize effects of the changing background signal on the average value of the picture signal.

6 Claims, 8 Drawing Figures

CIRCUIT SYSTEM FOR COMPENSATING THE INFLUENCE OF THE BACK-GROUND RADIATION ON THE PICTURE DISPLAY IN AN INFRA-RED CAMERA

The present invention relates to a circuit system for compensating the influence of the background radiation on the picture display in an IR (infrared) camera, where a video signal generated in a detector is fed to the picture tube and in which a picture signal and a background signal occur periodically and at different times.

In an IR camera, a rotating drum with a certain number of sides can perform the horizontal scanning function. The drum then deflects the received radiation against a rocking mirror, which gives the vertical scanning function. The rocking mirror, in turn, can reflect the radiation against a concave mirror which focuses the radiation against a detector to convert the received heat radiation into an electric video signal, whereby this signal will contain information concerning the temperature of the object being viewed.

If such drum is hexagonal, for instance, the picture field will be scanned six times when the drum has rotated one turn, or as many times as the drum has sides, and if, further, a horizontal line scanning of 25° is desired for the IR camera, for such a horizontal line scanning the drum should be turned 12.5°. This involves that the side of the drum in question, at the remaining part of its total turn of 60° will scan the inner wall of the camera housing. This, in turn, involves that the video signal obtained from the detector will contain "line periods," each of which contains a picture signal and a background signal which occur at different times and in the example chosen, which moreover conforms very well to the conditions presently utilized in practice, the background signal will be present approx. 80 percent of the "period," while the picture signal will last only approx. 20 percent.

The video signal from the detector must be amplified in the IR camera, and it is then appropriate to use a preamplifier, followed by an intermediate amplifier. For various reasons the amplifiers provided with a common D.C. feed-back, so that the mean value of the video signal at the output of the intermediate amplifier will be constant. The rise in temperature occurring in the camera after the start thereby causes the means value of the picture signal to decrease when the background signal increases owing to said rise in temperature. The influence of the rise in temperature on the mean value of the picture signal will be considerable, due to the fact that the duration of the background signal exceeds that of the picture signal by no less than five times. Thus, even a slight rise in temperature can have a great influence on the mean value of the picture signal. Such drawback has manifested itself in such a way that the picture obtained in the picture tube of the IR camers will be subjected to drifting, or, in other words, the temperature of the object displayed will be seemingly less, to a greater or lesser extent, during the warm-up time of the camera housing, which warm-up time is comparatively long, and often extends over the whole time the camera is being operated on the occasion in question. There is therefore a pronounced desire to be able to reduce this drift phenomenon to a greater or lesser extent, so that the camera can work with the same high degree of precision even during the warm-up time for the camera housing.

The present invention solves the above-mentioned problem by providing a compensating unit arranged to sense the video signal during a predetermined period of time during each line cycle or group of line cycles, and depending on the sensed part of the video signal generates a signal whose magnitude affects the mean value of the picture signal so that this will become more or less independent of a variation in the background signal.

An embodiment presently proposed which has the properties that are significant for the invention will be described in more detail in the following, with reference to the accompanying drawings, in which FIG. 1 shows schematically and in a horizontal view the scanning function in a representative IR camera;

Figures 3, 4:
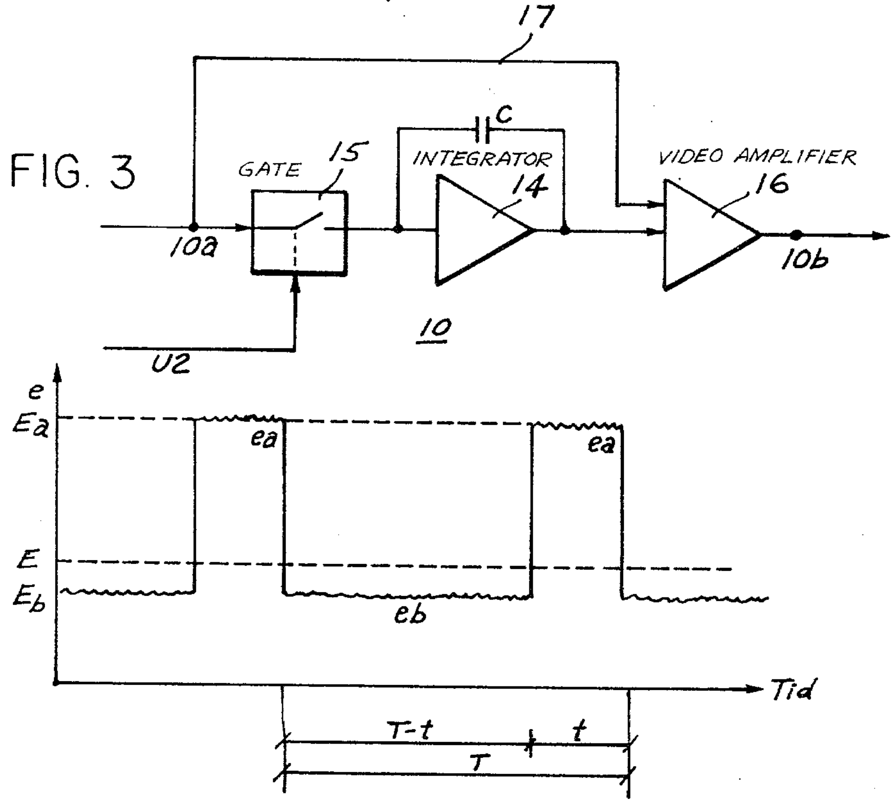
FIG. 3 shows a block diagram of a circuit system according to the invention.
FIG. 4 shows an example of a video signal obtained from the detector.
Figure 6A:
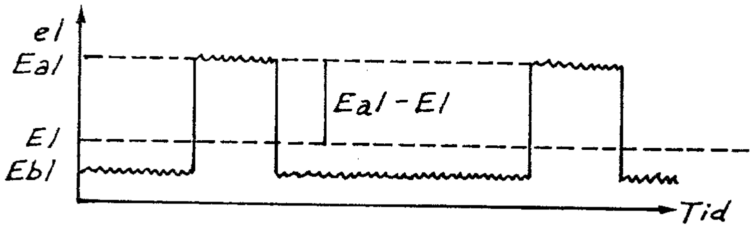
Figure 6B:
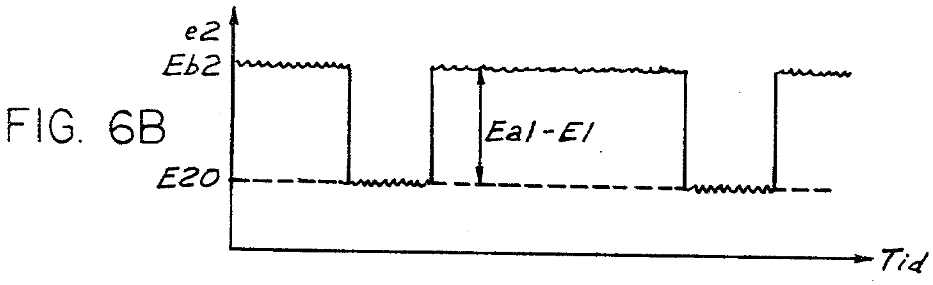
Figure 7:
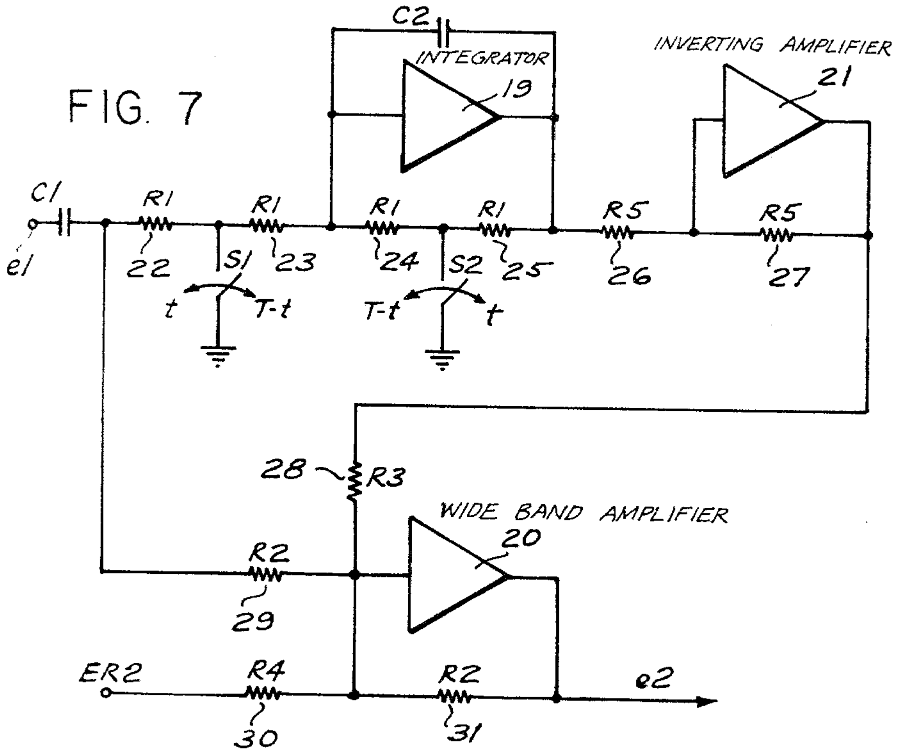

FIGS. 6*a* and 6*b* show in a diagram form the relation between the input and output signals of the circuit system according to FIG. 3;

FIG. 7 shows an example of a detailed circuit for the block diagram according to FIG. 3.

Figure 1:
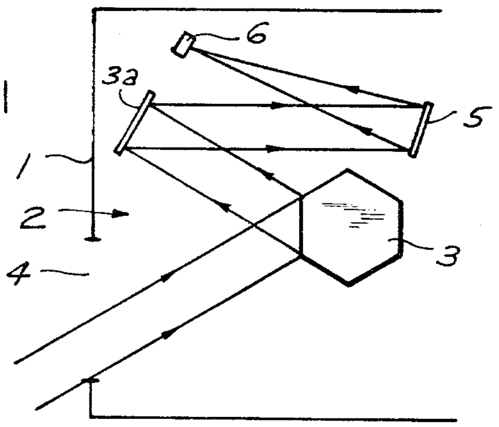

In FIG. 1, 1 designates a partly shown wall on a camera housing, the inner space of which is designated 2. In this space a hexagonal rotating drum 3 is placed, which, through an aperture 4, can make a horizontal line scanning of 25°. The vertical scanning function is achieved by means of a rocking mirror **3*a*, which scans the reflected radiation from the drum (see the lines). The rocking mirror reflects the radiation to a concave mirror 5, which focuses the radiation on a detector 6.**

Figure 2:
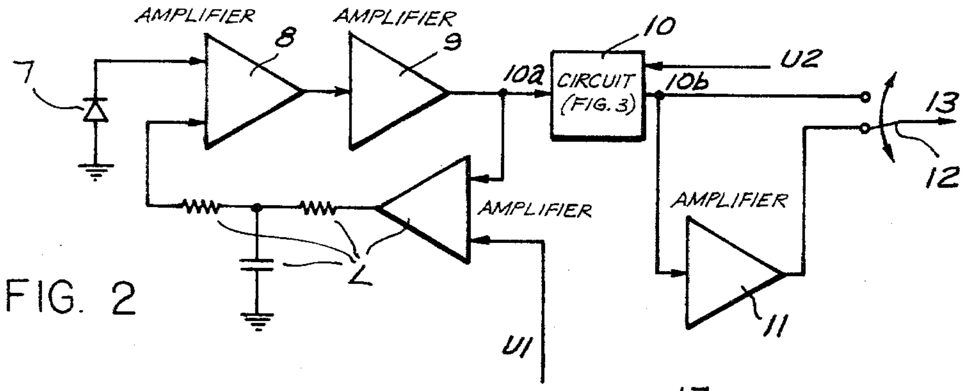
FIG. 2 shows schematically the invention included in a circuit diagram of, for example, an IR camera.

In FIG. 2, the electronics of detector 6 are designated 7. The video signal generated by the detector is amplified in a preamplifier 8 and in a following intermediate amplifier 9, the two amplifiers then being provided with a D.C. feed-back L. The video signal obtained, which has a mean value thus stabilized, is then fed into the circuit system according to the invention which in FIG. 2 is designated 10. The designation U1 is a reference voltage, while U2 designates a synchronizing pulse. Via an output **10*b* the circuit system in the present case is connected to an inverter 11, and to a change-over switch 12, with which it is possible to choose between an inverted or a normal picture on the output 13** connected to the picture tube (not shown).

In FIG. 3, the circuit system designated 10 in FIG. 2 is shown, the input of the circuit system being designated **10*a* and its output being designated 10*b*. In FIG. 3, a compensating unit has the form of an integrator, which is symbolized with 14 and a capacitor C. The integrator senses the video signal, which can have a predetermined mean value, via a gate 15 during a predetermined period of time during each line cycle, and then, dependent on the sensed part of the video signal, generates a signal magnitude in the form of a compensation voltage which influences the mean value of the picture signal, so that this, in all essential respects, obtains one and the same level. In this embodment, the predetermined period of time has been chosen so that it is equal to a first time $(T-t)$ in the line cycle during which the background signal occurs. The integrator is then connected to the video signal by the gate 15 being actuated by e.g. the line synchronizing pulse (U2) in the IR camera so that the gate is open during the time $t$ after the line synchronizing pulse. The signal generated in the integrator consists of a compensation voltage which has an appropriate amplitude and polarity, and which occurs at the output of the integrator. The compensation voltage is fed to a wide band video amplifier 16, which also, through a connection 17, continuously senses the entire video signal. The compensation voltage is thus superimposed on the input video signal to the circuit system, so that the video signal obtained at the output 10*b*** has the above-mentioned properties.

In FIG. 4, a line cycle in the video signal is designated T and it will also be noted that said cycle is composed of a background signal *eb* which is present during the time $(T-t)$ and a picture signal *ea* which has a duration of time $t$.

The mean values of the video signal (E), the picture signal (E*a*) and the background signal (E*b*) can thus be written:

$$E=\frac{1}{T}\int_{T} e\cdot dt;\ Ea=\frac{1}{t}\int_{t} ea\cdot dt;\ Eb=\frac{1}{T-t}\int_{T-t} eb\cdot dt.$$

The following equation is then obtained, which applies generally to both the input and output signals:

$$Ea\cdot t + Eb\cdot(T-t) = ET \qquad (1)$$

In the following, the input signals and -voltages have index 1, while the signals and voltages on the output have been given index 2.

Figure 5:
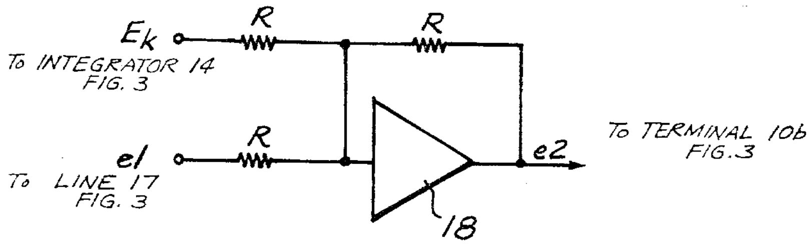
FIG. 5 shows a general amplifier connection which is applicable in the circuit system according to FIG. 3.

FIG. 5 shows the details of amplifier 16 of FIG. 3 and comprises an amplifier 18, which is connected together with three resistors R. The amplification factor of the amplifier is much greater than 1. The input video signal is designated *e*1, and the output signal *e*2, while a compensation voltage is designated Ek. The compensation voltage is a D.C. voltage which in the present embodiment is a function of the background radiation (Eb1). For FIG. 5, the following equation can be written:

$$e2 = -e1 - Ek \qquad (2)$$

If this equation is integrated over the times $T-t$, $t$ and $T$, one obtains for the time $$T-t;\ Eb2 = -Eb1 = Ek$$
$$t;\ Ea2 = -Ea1 - Ek$$
$$T;\ E2 = -E1 - Ek \qquad (3)$$

The amplifier according to FIG. 5 can now be compared with the video amplifier 16 according to FIG. 3, whereby the relation between $Ek$ and $Eb1$ can be written:

$$Ek = -K1\cdot Ea1 + K2\cdot ER \qquad (4)$$

in which $Ek$ is a function of Ea1 which, in turn, is given by equation (1). ER is a chosen D.C. voltage and K1 and K2 are constants, which are chosen in relation to each other so that if the mean values for the picture signal and the background signal during the times $t$ and $T-t$, respectively, are equal, the output video signal will always have a predetermined value, e.g. E20. Or in a mathematical form:

If $Ea1 = EB1 = E1$, then $Ea2 = Eb2 = E2 = E20$.

If this condition is introduced in equations (3) and (4) above, then $E2 = E20 = -E1 - Ek$ and $Ek = -K1\cdot E1 + K2\cdot Er$ which in turn implies $$K2\cdot ER = -E20 - E1\cdot(1-K1) \qquad (5)$$

with (2), (4) and (5) one obtains $$e2 = -e1 + K1\cdot Ea1 + E20 + E1(1-K1) \qquad (6)$$

If equation (6) thus obtained is examined in detail, it will be found that at full compensation when $K1 = 1$ the equation in question is reduced to:

$$e2 = -e1 + Ea1 + E20,$$

from which the mean value of the picture signal can be obtained, $$Ea2 = -Ea1 + Ea1 + E20 = E20,$$

which shows that the mean value of the picture is constant at E20 independent of the mean value of the input signal. The mean value of the video signal will then be $$E2 = E20 + (Ea1 - E1).$$

In FIGS. **6*a* and 6*b* the relation between the input and output voltages comprised in the equations above are indicated in diagram form. From FIG. 6*b* it will be noted, for instance, how the mean value of the picture signals obtains the predetermined level E20**. It will also be noted from these two Figures that the signals will be inverted.

FIG. 7 shows a detailed embodiment of how the circuit system according to the present invention can be constructed. The integrator is here designated 19 and C2, while the wide-band video amplifier is designated 20, and further, an inverter 21, 26 and 27 is connected between the integrator and the video amplifier. A first change-over switch S1 is open during the first time $(T-t)$ when the video signal $e1 = eb1$ (= the background signal) and is closed during the second time $t$ when $e1 = ea1$ (= the picture signal). A second change-over switch S2 is open during the second time $t$ and closed during the first time $T-t$. The first and second change-over switches S1 and S2, respectively, can appropriately be electronic, consisting of semiconductors etc.

The first change-over switch is then connected to the input video signal through a resistor 22 and to the integrator through a resistor 23. The integrator is connected to the change-over switch S2 through the negative feed-back resistors 24 and 25, the resistors 22–25 then having one and the same resistance R1. The integrator is also connected to the inverter, which consists of the resistors 26 and 27 and the amplifier 21. Both of the resistors 26 and 27 have a resistance R5. The wide-band video amplifier 20 senses the compensation voltage from the integrator via a resistor 28 (resistance R3), as well as the input video signal e1, the mean value of which has been set at zero with a capacitor C1, via a resistor 29 (resistance R2), and also, in case it is desired that the mean value of the output picture signal should be different from zero, a reference voltage ER2 of a predetermined size via a resistor 30 (resistance R4), the video amplifier being connected with negative feed-back by a resistor 31 (resistance R2).

For the circuit according to FIG. 7, $$e2 = -e1 + (R2/R3)\ Ea1 - (R2/R4)\ ER2 + E1(1 - R2/R3) \quad (7)$$

which is identical to equation (6) if $$K1 = (R2/R3) \text{ and}$$

$$E20 = -(R2/R4)\ ER2$$

In order to obtain full compensation with the circuit according to FIG. 7, it is necessary that $$R2 = R3\ (K1 = 1)$$

and equation (7) is thus reduced to $$e2 = -e1 + Ea1 - (R2/R4)\ ER2 \quad (8)$$

The mean value of the picture signal is obtained from (8):

$$Ea2 = -Ea1 + Ea1 - (R2/R4)\ ER2 = -(R2/R4)\ ET2$$

i.e. constant and independent of the background signal ***eb*1.**

The invention is not restricted to the above embodiment, but can be subject to modifications within the scope of the following claims. For instance, it is possible to make the predetermined period of time equal to the second time $t$ instead of equal to the first time $T-t$. Further, it is not necessary to sense the video signal every line cycle, but it can be sufficient to sense it once for a certain group of line cycles or, conversely, a group of line cycles, for instance such a group of line cycles as is comprises in a picture can be sensed one or several times, during the predetermined period of time each time. In order to achieve this, compared with what has been shown in FIG. 7, it is necessary to have a different but previously known construction of the gate arrangement. As will be noted from the above, the size of the degree of compensation can simply be chosen from zero to maximum, which can very well include values of more than 1, where 1, in accordance with the above, then corresponds to full compensation.

I claim:

1. Apparatus for generating a temperature stabilized video sugnal for an infra-red camera system comprising subject scanning means which line scans a subject and a temperature changing background, means for generating a video signal during each line scan, a first portion of the video signal ocurring during the same first predetermined period of time of each line scan being a background signal representing the temperature of the background and a second portion of the video signal occurring during the same second predetermined period of time of each line scan being a picture signal representing the subject, means for amplifying the video signal to provide an amplified video signal having a constant average valuse, sensing means operative during one of said predetermined periods of time of at least some of the line scans for sensing for the then occurring amplified video signal to generate a compensating signal, and means for superimposing on the amplified video signal the compensating signal to minimize the effect of the background signal portion of the video signal on the average value of the picture signal portion of the video signal.

2. Apparatus according to claim 1 characterized in that the predetermined period of time when said sensing means is operative is said first predetermined period of time of the line scan during which the background signal is present in the video signal.

3. Apparatus according to claim 1 characterized in that the predetermined period of time when said sensing means is operative is said second predetermined period of time of the line scan during which the picture signal is present in the video signal.

4. The apparatus according to claim 1 wherein said sensing means comprises a signal integrator and a gate for controllably transmitting the amplified video signal to said signal integrator.

5. The apparatus of claim 4 wherein said superimposing means includes a video amplifier having inputs for simultaneously receiving the amplified video signal and the compensating signal.

6. The apparatus of claim 1 wherein said video signal generating means comprises an infra-red transducer for generating an electric signal and first and second cascade amplifiers for amplifying the electric signal, said cascade amplifiers having a common D.C. feedback circuit.

* * * * *